United States Patent [19]

Amone et al.

[11] Patent Number: 5,478,915
[45] Date of Patent: * Dec. 26, 1995

[54] POLYIMIDE OLIGOMERS

[75] Inventors: Michael Amone, Carmel; Mark R. Southcott, Brewster, both of N.Y.

[73] Assignee: Ciba-Geigy Corporation, Tarrytown, N.Y.

[*] Notice: The portion of the term of this patent subsequent to May 20, 2012, has been disclaimed.

[21] Appl. No.: 175,817

[22] Filed: Dec. 30, 1993

Related U.S. Application Data

[63] Continuation-in-part of Ser. No. 45,395, Apr. 9, 1993, Pat. No. 5,413,065.

[51] Int. Cl.$^6$ .......................... C08G 69/26; C08G 73/10
[52] U.S. Cl. .......................... 528/353; 528/125; 528/128; 528/171; 528/172; 528/173; 528/174; 528/176; 528/183; 528/185; 528/188; 528/220; 528/229; 528/350; 528/352; 526/285; 428/411.1; 428/473.5
[58] Field of Search .................... 528/353, 125, 528/128, 171, 172, 173, 174, 176, 183, 185, 188, 220, 229, 350, 352; 526/285; 428/411.1, 473.5

[56] References Cited

U.S. PATENT DOCUMENTS

| | | | |
|---|---|---|---|
| 3,105,839 | 10/1963 | Rennere | 528/353 |
| 3,528,950 | 9/1970 | Lubowitz | 528/353 |
| 3,745,149 | 7/1973 | Serafini et al. | 528/353 |
| 3,803,081 | 4/1974 | Lubowitz | 528/353 |
| 3,856,752 | 12/1974 | Bateman et al. | 528/353 |
| 3,983,093 | 9/1976 | Williams, III | 528/353 |
| 4,395,527 | 7/1983 | Berger | 528/26 |
| 4,480,009 | 10/1984 | Berger | 428/447 |
| 4,552,931 | 11/1985 | St. Clair et al. | 528/353 |
| 4,794,157 | 12/1988 | Berdahl et al. | 528/208 |
| 4,830,953 | 5/1989 | Bateman | 430/197 |
| 4,959,440 | 9/1990 | Tamai et al. | 528/125 |
| 4,980,481 | 12/1990 | Lubowitz et al. | 548/435 |
| 4,981,922 | 1/1991 | Sheppard et al. | 525/422 |
| 5,087,701 | 2/1992 | Lubowitz et al. | 548/431 |
| 5,196,506 | 3/1993 | Tamai | 528/353 |
| 5,210,174 | 5/1993 | Tamai et al. | 528/353 |

FOREIGN PATENT DOCUMENTS

| | | |
|---|---|---|
| 62-231936 | 12/1987 | Japan . |
| 62-231935 | 12/1987 | Japan . |

OTHER PUBLICATIONS

Polymer News, 1987, vol. 12, pp. 294–306.
24th International SAMPE Technical Conference, Oct. 1992 pp. T983–T991.

*Primary Examiner*—P. Hampton-Hightower
*Attorney, Agent, or Firm*—William A. Teoli, Jr.

[57] ABSTRACT

Polyimide oligomers are described which comprise the condensation product of: at least one phenylindane diamine and at least one aromatic bis(ether anhydride). The polyimide oligomers of the invention are readily processed to form solution prepregable polyimide composites having high glass transition temperatures and high temperature and oxidative stability. More particularly, the present invention provides for crosslinkable polyimide oligomers prepared by reacting, in a suitable solvent under an inert atmosphere, a mixture of monomers comprising: (A) an aromatic diamine component comprising from about 25 to 100 mole % of at least one phenylindane diamine; (B) a dianhydride component comprising from about 25 to 100 mole % of at least one aromatic his(ether anhydride); and (C) at least one end-cap monomer selected from the group consisting of monoanhydrides, acyl halides and aromatic amines, wherein each end-cap monomer contains at least one crosslinkable functional group in the molecule. The crosslinkable polyimide oligomers of the present invention are characterized by a number average molecular weight of from about 1,000 to about 15,000.

26 Claims, No Drawings

POLYIMIDE OLIGOMERS

CROSS-REFERENCE TO RELATED APPLICATIONS

This application is a continuation-in-part of the parent application, Ser. No. 08/045,395 filed Apr. 9, 1993, now U.S. Pat. No. 5,413,065. Copending application Ser. No. 08/1345,395 is fully incorporated by reference herein and the benefit of said application Ser. No. 08/045,395 is claimed for all purposes pursuant to 37 CFR § 1.78.

TECHNICAL FIELD

The present invention relates to polyimide oligomers having high thermal and oxidative stability and to methods for their manufacture. More particularly, the present invention relates to polyimides oligomers that can be readily prepregged and cured to form advanced composites having aerospace applications.

BACKGROUND

Polymer-based composite materials are used in applications requiring performance at temperatures ranging from below ambient to 500° F. Typical applications include: compressor blades, ducts, splitters and thrust-vectoring flaps for jet engines, missile fins, wing components, radar domes, and other aerospace structures. Polyimide resins have been employed in such applications due to their high temperature and thermal stability properties.

Polyimide resins are generally produced either by condensation polymerization directly or by addition polymerization followed by a condensation rearrangement reaction to form the heterocyclic rings. Accordingly, $H_2O$ is a reaction product in either case and creates inherent difficulties in producing void-free composites. Voids have a deleterious effect on the shear strength, flexural strength, and dielectric properties of polyimide based composites.

In order to achieve high performance it has been previously proposed to use fully prereacted thermoplastic polyimides as the composite matrix. However, in this case the softening point or $T_g$ of the polyimide resin must be substantially above the intended use-temperature. Accordingly, a very high processing temperature is required which has the risk of causing pyrolytic degradation of the resin. Moreover, the pressure needed to achieve the required resin flow often is higher than commercially available equipment is capable of sustaining.

In recent years, attempts have been made to resolve certain of these disadvantages. For example, in U.S. Pat. Nos. 3,528,950, 3,745,149 and 3,083,081, polyimides are prepared from coreacting certain polyfunctional amines, polyfunctional anhydrides and end-capping monoanhydrides in an attempt to alleviate processing, stability and economic disadvantages.

More recently, certain soluble polyimides, such as those described in Bateman et al U.S. Pat. No. 3,856,752 which is assigned to the same assignee as the present invention, have been described. Such polyimides are prepared by utilizing diaminodiphenylindane and aromatic dianhydrides. The resultant polyimides exhibit numerous advantages over the polyimides of the prior art but still encounter certain processing problems due to reduced solubility and flow characteristics.

Polyimide materials that are derived from in situ reacted monomers and oligomers have been used successfully in high performance environments. Processing problems normally associated with resin flow are less severe for such materials owing to their low molecular weight relative to fully prereacted thermoplastic polyimides. One such material is PMR-15 which is described in U.S. Pat. No. 3,745,149. The acronym PMR stands for in situ polymerization of monomeric reactants. The -15 refers to a formulated molecular weight of 1500. PMR-15 is an addition polyimide derived from the dimethyl ester of benzophenone tetracarboxylic dianhydride (BTDE), the monomethyl ester of nadic anhydride (NE) and 4,4'-methylene dianiline (MDA). Addition polymerization is made possible by the use of the nadic end groups, which react without further evolution of volatiles at 250°–350° C.

While PMR-15 provides significant benefits, this resin and intermediate materials (e.g., prepregs) derived from it have certain disadvantages. Among these are toxicity, short shelf life, and handling difficulties during processing. The toxicity originates from MDA which is considered a suspect human carcinogen by the U.S. Environmental Protection Agency. Such real or perceived risks associated with PMR-15 are expected to hamper subsequent applications for this material.

Accordingly, there continues to be a need for polyimides for high performance applications, such as aerospace needs, which require elevated temperature performance in combination with chemical stability and greater ease in processing.

SUMMARY

The present invention relates to polyimide oligomers comprising the condensation product of: at least one phenylindane diamine and at least one aromatic bis(ether anhydride). The present invention also relates to the discovery that such polyimide oligomers can be readily processed to form solution prepregable polyimide composites having high glass transition temperatures and high temperature and oxidative stability. More particularly, the present invention provides for crosslinkable polyimide oligomers prepared by reacting, in a suitable solvent under an inert atmosphere, a mixture of monomers comprising: (A) an aromatic diamine component comprising from about 25 to 100 mole % of at least one phenylindane diamine; (B) a dianhydride component comprising from about 25 to 100 mole % of at least one aromatic his(ether anhydride); and (C) at least one end-cap monomer selected from the group consisting of monoanhydrides, acyl halides and aromatic amines, wherein each end-cap monomer contains at least one crosslinkable functional group in the molecule. The crosslinkable polyimide oligomers of the present invention are characterized by a number average molecular weight of from about 1,000 to about 15,000.

DETAILED DESCRIPTION

Unless otherwise indicated, the terms used in this specification and in the appended claims are intended to be interpreted in their art recognized generic sense. Certain terms which are used in this specification and the appended claims are defined below.

The term "polyimide oligomer(s)" is intended to describe oligomeric materials that are produced by the condensation of the at least three dissimilar monomers (A), (B) and (C), but does not exclude the presence of additional monomers unless otherwise clearly indicated herein.

The term "aromatic" when used in conjunction with a chemical group such as "aromatic radical", "aromatic diamine", "aromatic his(ether anhydride)", etc., is intended to describe organic compounds or radicals thereof containing at least one closed homocyclic or heterocyclic nucleus that possess a closed loop of electrons (the so-called aromatic sextet). For example, organic compounds or radicals thereof containing a single aromatic nucleus (e.g., benzene, pyridine, thiophene, 1,2,3,4-tetrahydronaphthalene, etc.) as well as compounds or radicals containing polynuclear aromatic moieties are intended. The polynuclear aromatic moieties can be of:

(i) the fused type wherein at least two aromatic nuclei are fused such as found, for example, in naphthalene, anthracene, the azanaphthalenes, etc., or (ii) the linked type wherein at least two aromatic nuclei (either mono or polynuclear) are linked through bridging linkages to each other as found, for example, in bisphenol A, benzidine, diphenyl ether, diphenyl sulfone, etc. Suitable bridging linkages are well known to those skilled in the art and include, for example, carbon-to-carbon single bonds, ether, keto, alkylene, sulfonyl, sulfinyl, amino, sulfide, and mixtures of such divalent bridging linkages.

The term "hydrocarbyl" when used in conjunction with a chemical group such as "hydrocarbyl radical" is intended to describe organic compounds or radicals thereof which include hydrocarbon as well as substantially hydrocarbon groups. This includes aromatic (defined above) as well as aliphatic and alicyclic (both saturated and unsaturated) groups, radicals or substituents.

"Substantially hydrocarbon" describes organic compounds or radicals thereof that have a predominant amount of carbon and hydrogen atoms (i.e., at least about 50 mole %), but which also contain non-hydrocarbon substituents or heteroatoms in a ring or chain otherwise composed of carbon atoms. Those skilled in the an will be aware of suitable non-hydrocarbon substituents (e.g., halogen, hydroxy, alkoxy, mercapto, alkylmercapto, nitro, nitroso, sulfoxy, etc.). In addition, suitable heteroatoms will be apparent to those of ordinary skill in the an and include, for example, sulfur, oxygen, nitrogen, etc.

The term "crosslinkable" is intended to describe the chemical functionality of certain substituent groups of the end-cap monomers (C) and the polyimide oligomers, which groups are capable of interacting with, e.g., reactive sites in the backbone of a polymer, an oligomer molecule, or a substrate material, to form a primary, covalent chemical bond during a crosslinking or curing process. In general, such crosslinkable functional groups will contain at least one unsaturation site, but also can include in lieu of or in addition to at least one unsaturation site, functions capable of: hydroxyl-transetherfication crosslinking; amine-amide crosslinking; oxirane ring opening; and hydroxyl-isocyante crosslinking or urethane formation.

The term "at least one" when used in conjunction with a chemical group, recurring unit or the like, is intended to provide for the presence of one or more than one of such groups or units in the molecule, oligomer or a monomer mixture, as the case may be. In other words, the present invention contemplates both individual chemical groups and units as well as mixtures of such materials as defined herein.

The term "divalent aromatic radical" is intended to describe aromatic chemical groups which have two free valences attached to an aromatic ring; either both valences are on the same ring or each valence is on a differenet aromatic ting in the radical.

The term "lower" as used in the present specification and claims, when used in conjunction with groups such as alkyl is intended to describe such groups which contain a total of up to 7 carbon atoms.

In one embodiment of the present invention, polyimide oligomers are synthesized from a mixture of monomers comprising:

(A) an aromatic diamine component selected from:

(A-i) from about 25 to about 100 mol % of at least one phenylindane diamine represented by the formula

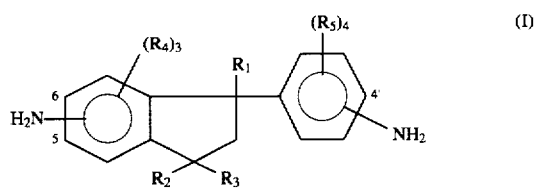

wherein $R_1$, $R_2$ and $R_3$ independently are hydrogen or lower alkyl, and each $R_4$ and each $R_5$ independently are hydrogen, halogen or lower alkyl; and (A-ii) from 0 to about 75 mole % of at least one aromatic diamine, other than a phenylindane diamine, represented by the formula

$$H_2N-R-NH_2 \qquad (II)$$

wherein R is a divalent aromatic radical;

(B) a dianhydride component selected from:

(B-i) from about 25 mole % to about 100 mol % of at least one aromatic his(ether anhydride) represented by the formula

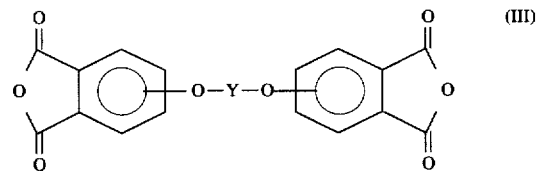

wherein Y is a divalent aromatic radical; and (B-ii) from 0 mol % to about 75 mol % of at least one dianhydride, other than an aromatic his(ether anhydride), represented by the formula

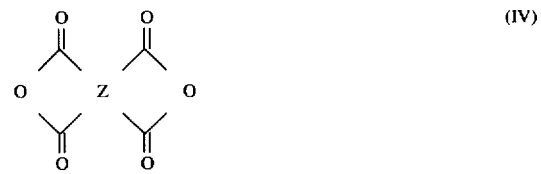

wherein Z is a tetravalent hydrocarbyl radical; and (C) at least one end-cap monomer selected from the group consisting of monoanhydrides, acyl halides and mines, wherein each end-cap monomer (C) contains at least one crosslinkable functional group in the molecule.

The molar amounts for the various monomers (A), (B) and (C) in the mixture are selected so that the resultant polyimide oligomer has a number average molecular weight of from about 1,000 to about 15,000 and, more particularly, from about 3,000 to about 10,000. The reaction typically occurs by mixing all the monomers in a suitable solvent under an inert atmosphere. Heating the mixture increases the reaction rate.

Excess aromatic diamine (A) or dianhydride (B) may be provided, although substantially stoichiometric amounts of such materials may also be used (i.e., the equivalence of amine calculated to equal the equivalence of the total anhydride content). In general, a sufficient amount of the end-cap monomer (C) is employed so that polyimide oligomers are obtained which have a crosslinkable end-cap at each distal end of the oligomer molecule. In one embodiment, a stochiometric excess of (C) is employed to ensure that each oligomer molecule contains two end-caps.

In one embodiment, when the end-cap monomer (C) is a monoanhydride or an acylhalide, the aromatic diamine component (A) generally will be present in a stoichiometric or molar excess relative to the dianhydride component (B) so that the resultant polyimide oligomer molecules will terminate with amine functions that can react with the monoanhydride and/or acylhalide end-cap monomer. In a specific embodiment, the molar ratio of monomers (A):(B):(C) generally is (1):(1-n):(~2.1n), where n is a number of from about 0.03 to about 0.25 and the symbol (~) means +/−10%. In a more specific embodiment, the molar ratio (A):(B):(C) is from about 1.00:0.75–0.97:0.06–0.50, more particularly, about 1.00:0.84–0.93:0.14–0.32 and, most particularly, about 1.00:0.80–0.88:0.24–0.40.

In like manner, in embodiments wherein the end-cap monomer (C) is an amine, the dianhydride component (B) generally will be present in a stoichiometric or molar excess relative to the aromatic diamine component (A) so that the resultant polyimide oligomer molecules will terminate with functional groups capable of reacting with the amine (C). In a specific embodiment, the molar ratio of monomers (A):(B):(C) generally is (1-n):(1):(~2. 1n), where n is a number of from about 0.03 to about 0.25 and the symbol (~) means +/−10%. In a more specific embodiment, the molar ratio ( A ):(B ):(C) is from about 0.75–0.97:1:00:0.06–0.50, more particularly, about 0.84–0.93: 1.00:0. 14–0.32 and, most particularly, about 0.80–0.88:1.00:0.24–0.40.

Those skilled in the an will appreciate that the molar ratio and mole % values for the recurring structural units in the polyimide oligomers of the invention will correspond generally to the molar amounts for the various monomers (A), (B) and (C) used in the reaction mixture.

(A) Aromatic diamines

One of the essential components used in the preparation of the polyimide oligomers of this invention is (A) an aromatic diamine component consisting of (A-i) at least about 25 mole of at least one phenylindane diamine, and (A-ii) up to about 75 mole % of at least one aromatic diamine, other than a phenylindane diamine.

In one embodiment, the aromatic diamine component (A) will consist of about 50–75 mole % (A-i) and about 25–50 mole % (A-ii), more particularly, about 75 mole % (A-i) and about 25 mole % (A-ii).

In another embodiment, the aromatic diamines (A-ii) will not be present, in which case the aromatic diamine component (A) will contain about 11210 mole % of at least one phenylindane diamine (A-i).

In one embodiment, the applicable phenylindane diamines (A-i) correspond to the formula

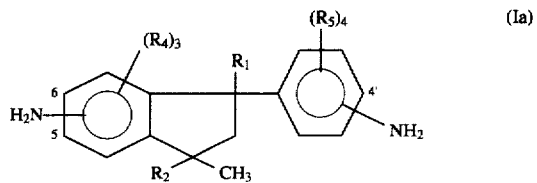

wherein $R_1$ and $R_2$ independently are hydrogen or $C_1$–$C_5$ alkyl, and each $R_4$ and each $R_5$ independently are hydrogen, halogen (especially chloro, bromo and fluoro), or $C_1$–$C_4$ alkyl, and the amino group on the indane ring is at the 5 or 6 position.

The phenylindane diamines (A-i) can consist of any combination of the isomeric or substituted isomeric phenylindane diamine compounds. For example, the phenylindane diamines (A-i) can comprise from 0 to 100 mole % of 5-amino-1-(4'-aminophenyl)-1,3,3-trimethylindane in combination with from 100 to 0 percent of 6-amino-1-(4'-aminophenyl)-1,3,3-trimethylindane. Further, either or both of these isomers can be substituted over the entire range from 0 to 100 percent by any of the substituted diamino isomers without impairing the novel soluble nature of the polyimides. Examples of such substituted diamino isomers are 5-amino-6-methyl- 1-(3' -amino-4' -methylphenyl)- 1,3, 3-trimethylindane, 5-amino- 1-(4'-amino-Ar',Ar'-dichlorophenyl)-Ar,Ar-dichloro- 1,3,3-trimethylindane, 6-amino-1-(4'-amino- At' ,Ar'-dichloro-phenyl)-Ar,Ar-dichloro- 1,3, 3-trimethylindane, 4-amino-6-methyl- 1(3' -amino-4' -methyl-phenyl)- 1,3,3-trimethylindane and Ar-amino- 1-(Ar'-amino-2' ,4 '-dimethylphenyl)-1,3,3,4,6-pentamethylindane. The prefixes Ar and Ar' in the above formulae indicate indefinite positions for the given substituents in the phenyl rings.

Among the phenylindane diamines (A-i), there can be mentioned those in which $R_1$ and $R_2$ independently are hydrogen or methyl, and each $R_4$ and each $R_s$ independently is hydrogen, methyl, chloro or bromo. In particular, suitable phenylindane diamines are those in which $R_1$ is hydrogen or methyl, and $R_4$ independently are hydrogen, methyl, chloro or bromo, and the amino groups are at positions 5, 6, or 7 and at positions 3' or 4'. Because of relative availability, the phenylindane diamines which are particularly suitable include compounds wherein $R_1$ and $R_2$ are methyl, $R_4$ and $R_5$ are hydrogen, and the amino groups are at positions 5 or 6 and at position 4' are known as DAPI. DAPI has the structural formula

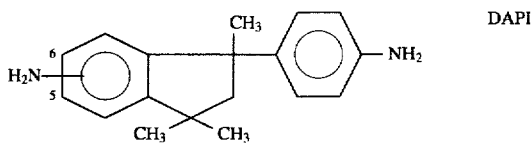

in which the amino on the indane ring is at the 5 or 6 position.

The phenylindane diamines and methods for their preparation are disclosed in U.S. Pat. Nos. 3,856,752 and 3,983, 092, which patents are fully incorporated by reference herein with respect to their disclosure pertaining to the preparation of such materials.

The aromatic diamines, other than a phenylindane diamine, (A-ii) correspond to the formula

(II)

wherein R is a divalent aromatic radical, more particularly, a divalent $C_6$–$C_{24}$ aromatic radical. It will be understood that the amino groups of formula II are attached to an aromatic ring; either both amino groups reside on the same aromatic ring or each amino group is attached to a different aromatic ring in the molecule.

In one embodiment, R is a divalent aromatic radical selected from the group consisting

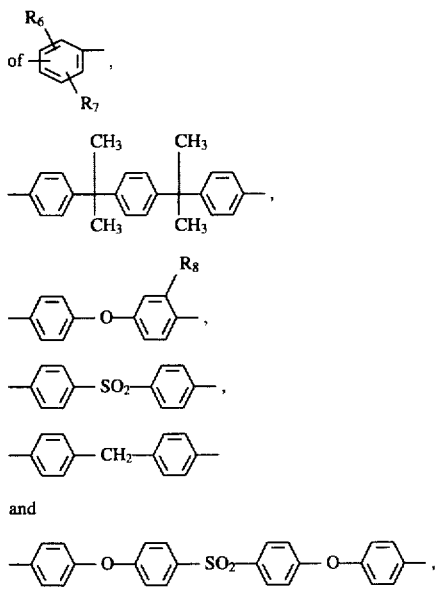

and wherein $R_6$, $R_7$ and $R_8$ independently are hydrogen or lower alkyl and, more particularly, hydrogen or alkyl having 1 to 4 carbon atoms.

Representative examples of useful aromatic diamines (A-ii) include:
  para-phenylenediamine,
  meta-phenylenediamine,
  4,4'-diamino-diphenylpropane,
  4,4'-diamino-diphenylmethane,
  benzidine,
  4,4'-diamino-diphenyl sulfide,
  4,4'-diamino-diphenyl sulfone,
  3,3'-diamino-diphenyl sulfone,
  4,4'-diamino-diphenyl ether,
  1,5-diamino-naphthalene,
  3,3'-dimethoxy benzidine,
  2,4-bis(beta-amino-t-butyl)toluene,
  bis-(para-beta-amino-t-butylphenyl)ether,
  bis-(para-beta-methyl-delta-amino-pentyl)benzene,
  bis-(para-1,1-dimethyl-5-amino-pentyl)benzene,
  1-isopropyl-2,4-metaphenylene diamine,
  m-xylene diamine,
  N,N,N',N'-tetramethyl-4,4'-diaminodiphenylmethane,
  3,3'-dimethyl benzidine, etc., and mixtures thereof.

Among the foregoing compounds, there can be particularly mentioned $C_6$–$C_{14}$ aromatic diamines such as p-phenylenediamine, m-phenylenediamine, 4,4'-diaminodiphenyl ether (ODA), 4,4'-diamino-diphenyl sulfone, m-xylylenediamine and bis(p-aminophenyl) methane.

Those skilled in the art will appreciate that the divalent aromatic radical R will include the divalent residues of any of the aforementioned diamines after the amino functional groups have been removed.

Methods for preparing the aromatic diamines (A-ii) are within the knowledge of the art and many suitable aromatic diamines are commercially available.

(B) Dianhydrides

A further required component for the preparation of the polyimide oligomers of this invention is (B) a dianhydride component consisting of (B-i) at least about 25 mole % of at least one aromatic bis(ether anhydride), and (B-ii) up to about 75 mole % of at least one dianhydride, other than aromatic bis(ether anhydride).

In one embodiment, the dianhydride component (B) will consist of about 50–75 mole % (B-i) and about 25–50 mole % (B-ii), more particularly, about 75 mole % (B-i) and about 25 mole % (B-ii).

In another embodiment, the dianhydrides (B-ii) will not be present, in which case the dianhydride component (B) will contain about 100 mole % of at least one aromatic bis(ether anhydride) (B-i).

The aromatic bis(ether anhydrides) (B-i) can be prepared by a number of known methods and many are commercially available. For example, the his(ether anhydrides) (B-i) are prepared by coupling an appropriate xylene derivative, such as a 4-haloxylene or the alkali metal phenoxide of 4-xylenol, with an appropriate halide or aryloxide, via the Ullman synthesis. This reaction employs a copper catalyst, followed by oxidation of the aromatic methyl groups and dehydration to effect ring closure as described in U.S. Pat. No. 4,480,009 which is incorporated by reference herein for its disclosure pertaining to this reaction. The reaction can be schematically exemplified as follows.

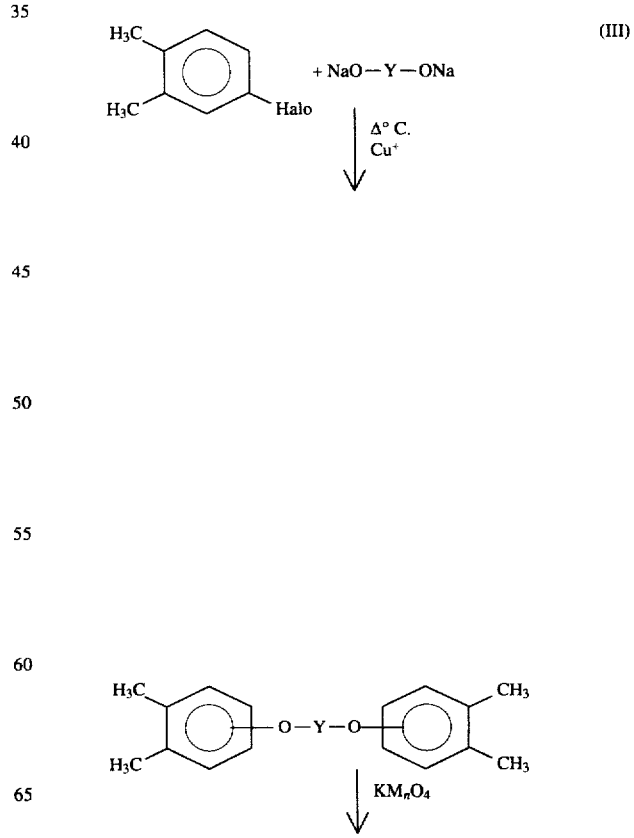

(III)

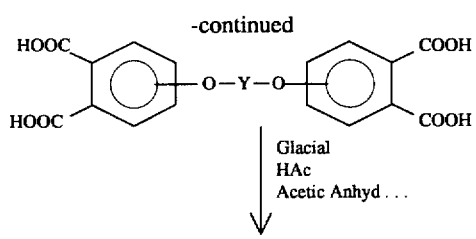

```
    Glacial
    HAc
    Acetic Anhyd...
      ↓
```

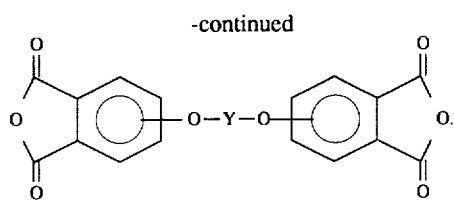

In a one embodiment, group Y is a divalent aromatic radical of the formula

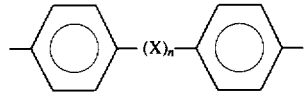
(IIIa)

wherein X is a divalent radical selected from the group consisting of

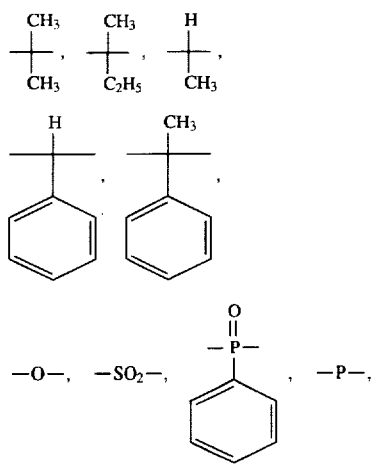

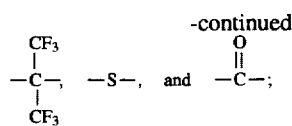

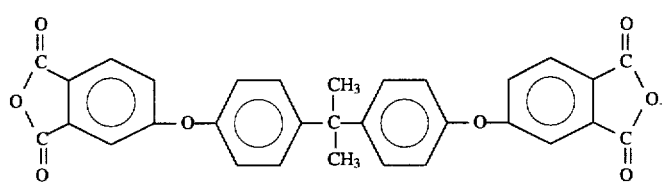

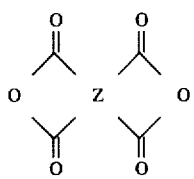

The dianhydrides, other than an aromatic bis(ether anhydride), (B-ii) correspond to the formula

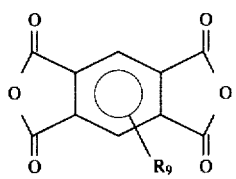
(IV)

wherein Z is a tetravalent hydrocarbyl radical.

In one embodiment, Z is a tetravalent aromatic radical of, for example, (B-ii.1) substituted or unsubstituted phenyl, naphthyl or biphenyl rings; (B-ii.2) two phenyl rings linked by a direct bond. O, S, SO₂, carbonyl or alkylene; or (B-ii.3) aromatic rings containing heterocyclic atoms such as pyrazine or thiophene.

In another embodiment, the dianhydrides (B-ii) correspond to the formulae

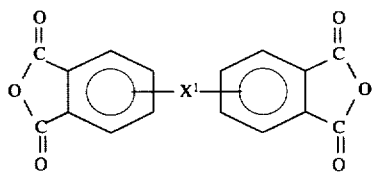
(IVa)

wherein R₉ is hydrogen or lower alkyl;

(IVb)

wherein X¹ is selected from the group consisting of a direct carbon-to-carbon bond, O, SO₂, S, and a divalent carbonyl radical

Suitable dianhydrides (B-ii) also can be aliphatic in nature, such as cyclopentane tetracarboxylic acid dianhydride, cyclohexane tetracarboxylic acid dianhydride and butane tetracarboxylic acid dianhydride.

Among the useful dianhydrides (B-ii) there can be mentioned:

pyromellitic dianhydride,
3,3',4,4'-benzophenone tetracarboxylic dianhydride,
2,2',3,3'-benzophenone tetracarboxylic dianhydride,
3,3',4,4'-diphenyl tetracarboxylic dianhydride,
2,2',3,3'-diphenyl tetracarboxylic dianhydride,
2,2-bis-(3,4-dicarboxyphenyl) propane dianhydride,
2,2-bis-(2,3-dicarboxyphenyl) propane dianhydride,
bis-(3,4-dicarboxyphenyl) ether dianhydride,
bis-(3,4-dicarboxyphenyl) sulfone dianhydride,
bis-(3,4-dicarboxyphenyl) sulfide dianhydride,
1,1-bis-(2,3-dicarboxyphenyl) ethane dianhydride,
1,1-bis-(3,4-dicarboxyphenyl) ethane dianhydride,
bis-(2,3-dicarboxyphenyl) methane dianhydride,
bis-(3,4-dicarboxyphenyl) methane dianhydride,
2,3,6,7-naphthalene tetracarboxylic dianhydride,
1,2,4,5-naphthalene tetracarboxylic dianhydride,
1,2,5,6-naphthalene tetracarboxylic dianhydride,
benzene-1,2,3,4-tetracarboxylic dianhydride,
perylene-3,4,9,10-tetracarboxylic dianhydride,
pyrazine-2,3,5,6-tetracarboxylic dianhydride,
thiophene-2,3,4,5-tetracarboxylic dianhydride,
naphthalene-1,4,5,8-tetracarboxylic dianhydride,
decahydronaphthalene-1,4,5,8-tetracarboxylic dianhydride,
4,8-dimethyl-1,2,3,5,6,7-hexahydronaphthalene-1,2,5,6-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,8,9,10-tetracarboxylic dianhydride,
cyclopentane-1,2,3,4-tetracarboxylic dianhydride,
pyrrolidine-2,3,4,5-tetracarboxylic dianhydride,
pyrazine-2,3,5,6-tetracarboxylic dianhydride,
1,2,3,4-butane tetracarboxylic dianhydride,
3,4,3',4'-benzophenone tetracarboxylic dianhydride,
azobenzene tetracarboxylic dianhydride,
2,3,4,5-tetrahydrofuran dianhydride, etc., and mixtures thereof.

Among the foregoing dianhydrides, there can be particularly mentioned aromatic dianhydrides (B-ii) including:
pyromellitic dianhydride,
3,3',4,4'-benzophenone tetracarboxylic acid dianhydride,
3,3',4,4'-biphenyl tetracarboxylic acid dianhydride,
3,3',4,4'-diphenylsulfone tetracarboxylic dianhydride, and
4,4'-oxydiphthalic dianhydride.

Those skilled in the art will appreciate the tetravalent hydrocarbyl radical Z will include the tetravalent residues of any of the aforementioned dianhydrides after the anhydride functional groups have been removed.

In general, the dianhydrides (B-ii) and methods for their preparation are within the skill of the art. For example, certain dianhydrides and methods for their preparation are disclosed, for example, in U.S. Pat. Nos. 3,745,149 and 3,856,752 which patents are incorporated by reference herein for their teachings related to such materials.

(C) End-cap monomer

A key component of the monomer mixture is an end-cap monomer (C) which is selected from the group consisting of (C-i) monoanhydrides, (C-ii) acyl halides and (C-iii) aromatic amines, wherein each end-cap monomer (C) contains at least one crosslinkable group in the molecule. In general, the crosslinkable group reacts without evolution of volatiles, due to imidization, during the curing of the polyimide oligomers. Illustrative crosslinkable groups include vinyl, ethynyl, maleimido, cyano, nadic and acetylenic functions.

In one embodiment, the end-cap monomers (C) contain from about 1 to about 2 crosslinkable groups in the molecule. More particularly, the monomers (C) will contain 1 crosslinkable functional group.

In one embodiment, the aromatic amines (C-iii) contain from 6 to about 30 carbon atoms.

Illustrative end-cap monomers (C) include, for example, those represented by the following formulae (1) through (9):

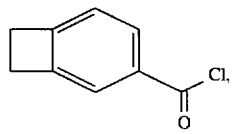

(1)

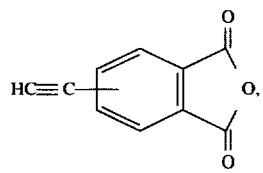

(2)

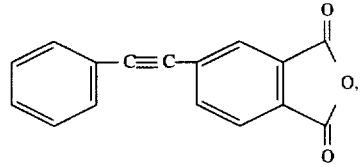

(3)

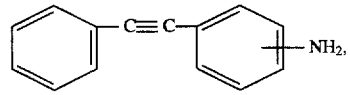

(4)

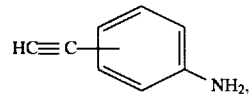

(5)

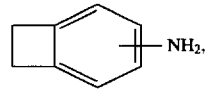

(6)

-continued

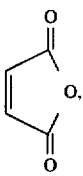
(7)

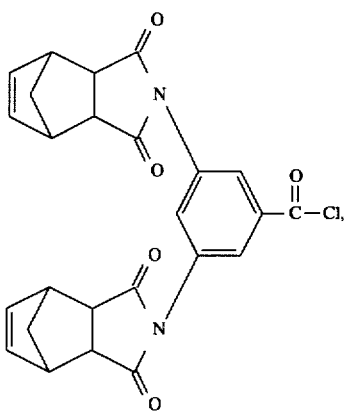
(8)

and

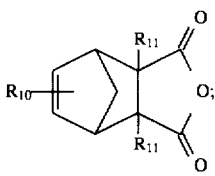
(9)

wherein $R_{10}$ is allyl or methallyl; and $R_{11}$ is hydrogen or lower alkyl, more particularly, wherein $R_{10}$ is allyl and $R_{11}$ is hydrogen (i.e., allyl nadic anhydride or ANA).

Suitable end-cap monomers (C) are prepared by a variety of known methods and many suitable end-capping agents are commercially available. For example, methods for preparing nadic anhydrides (9) wherein $R_{10}$ is allyl or methallyl and $R_{11}$ is hydrogen are disclosed in U.S. Pat. No. 3,105,839 which is incorporated by reference herein for its disclosure related to the preparation of such materials.

POLYIMIDE OLIGOMERS

The polyimide oligomers of the present invention can be prepared by any of a number of methods known in the art including those set forth in Kirk-Othmer, *Encyclopedia of Chemical Technology*, Vol. 18, Third ed., pp. 706–710 (1982). In one embodiment, the polyimide oligomers of the present invention are prepared by a solution polymerization process wherein the monomers (A), (B), and (C) are reacted in an organic reaction medium which is a solvent for at least one of the reactants, preferably under substantially anhydrous conditions and under an inert atmosphere. The initial reaction conditions are generally reflux, particularly at a temperature below about 100° C. and conveniently at room temperature.

Those skilled in the art will be aware of suitable solvents which include, for example, dimethylformamide, dimethylacetamide, dimethyl sulfoxide, N-methylpyrrolidinone, and m-cresol.

As noted above, it is usually desirable to follow the conventional procedure of eliminating oxygen from the atmosphere with which the monomeric solutions are in contact while the polymerization reaction is occurring. This can be accomplished by the usual procedure of purging the polymerization vessel with argon, nitrogen or other inert oxygen-free gas and closing the vessel, or for an open vessel continuing a slow flow of the inert gas through the vessel throughout the reaction. Any conventional mixing device can be used such as a rotator or propeller to achieve a rapid and complete mixing of the reactants (A), (B) and (C).

The initial product of the reaction is a polyamic acid which contains, inter alia, structural units represented by the formula:

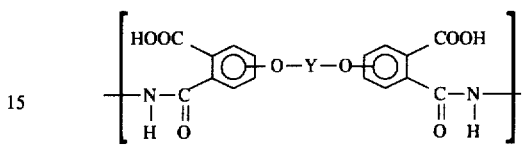

The polyamic acid is subsequently converted to the polyimide by several methods which include (1) heating the polyamic acid solution at temperatures between 100° C. and 240° C. depending on the boiling point of the organic solvent (in this stage an azeotropic solvent, e.g. toluene can be used), until imidization is complete or; (2) by chemical means, e.g. by adding to the polyamic acid solution a dehydrating agent such as acetic anhydride alone or in combination with a tertiary amine catalyst such as pyridine or triethylamine, and conveniently at room temperature.

More specifically, the preparation of the polyamic acid which is subsequently converted to the polyimide oligomers of the present invention can be conveniently carried out in a number of ways. The aromatic diamine(s) (A), dianhydride(s) (B) and end-capping agent(s) (C) can be premixed as dry solids in appropriate molar amounts and the resulting mixture can be added, in small portions and with agitation, to an organic solvent. Alternately, this order of addition can be reversed, e.g., after premixing the diamine(s) (A), the dianhydride(s) (B) and the end-capping agent(s) (C), the solvent may be added to the mixture with agitation. It is also possible to dissolve the diamine(s) (A) in the solvent while agitating and to add slowly the dianhydride(s) (B) and end-capping agents (C) in portions that provide a controllable rate of reaction. However, this order of addition can also be varied. Still another process involves dissolving the diamine(s) (A) in one portion of a solvent and the dianhydride(s) (B) and end-capping agents (C) in another portion of the same or another solvent and then mixing the two solutions.

In one embodiment, to effect the conversion of the polyamic acids to the polyimides, the polyamic acids are heated above 50° C. in an inert atmosphere and, more particularly, to between 110° to 240° C. in an inert atmosphere. In a typical process, the polyamic acids are prepared at a temperature below 50° C. and maintained at this temperature until maximum viscosity is obtained, denoting maximum polymerization. The polyamic acid, in solution and under an inert atmosphere, is subsequently heated to about 100° C. to 240° C. to convert the polyamic acid to the polyimide. The polyimide may be alternatively prepared by mixing the diamine(s) (A), dianhydride(s) (B) and end-capping agent(s) (C) at room temperature in a solvent such as nitrobenzene and then rapidly heating the mixture to reflux for about 2 to 12 hours.

The total reaction time period from monomer mixture to polyimide oligomer is generally within the range of about 2 to about 16 hours and more frequently is approximately 4 to about 8 hours.

The polyimide oligomers are precipitated from their reaction solutions by use of a nonsolvent for the oligomer such as methanol, water, or acetone. The polyimide oligomers are then oven dried, vacuum tumble dried or spray dried and the like. The resulting polyimide oligomers are characterized by superior processability and are readily processed to form solution prepregable polyimide composites having high glass transition temperatures and high temperature and oxidative stability. The polyimide oligomers also can be used as a powder thermoset molding type composition. Other appropriate ingredients can be added to the polyimide oligomer solutions or molding powders including fillers, dyes, pigments, thermal stabilizers, as well as standard reinforcing materials, such as glass fiber, graphite, carbon fibers, chopped glass, chopped carbon fibers, clay, silica, boron and the like, depending on the end use.

Composites are made from the polyimide oligomers of the invention by the following method and exhibit high Tg's and unlike most polyimides are solution prepregable (i.e. soluble in common solvents). Suitable solvents include, for example, N-methylpyrrolidinone, dimethylformamide, 1,3-dioxalane, dimethylsulfoxide, α-butyral lactone, diglyme, chloroform, methylene chloride, etc.

In another embodiment, the present invention pertains to polyimide oligomers that comprise:

(A-1) at least about 10 mole % of a recurring moiety represented by the formula (I. 1)

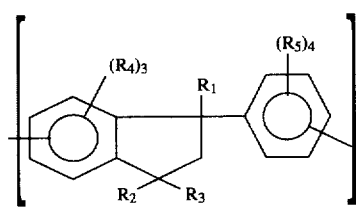
(I.1)

wherein $R_1$, $R_2$ and $R_3$ independently are hydrogen or lower alkyl, and each $R_4$ and each $R_5$ independently are hydrogen, halogen or lower alkyl, more particularly, wherein $R_1$ and $R_2$ independently are hydrogen or $C_1$-$C_5$ alkyl, $R_3$ is $C_1$-$C_4$ alkyl (e.g., methyl) and each $R_4$ and each $R_5$ independently are hydrogen, halogen (especially chloro, bromo and fluoro), or $C_1$-$C_4$ alkyl;

(A-2) from 0 to about 40 mole % of a recurring moiety represented by the formula (II.1)

(II.1)

wherein R is divalent aromatic radical, more particularly, a divalent $C_6$-$C_{24}$ aromatic radical and, most particularly, R is a divalent aromatic radical selected from the group consisting of

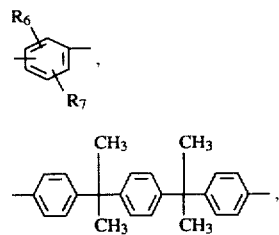

-continued

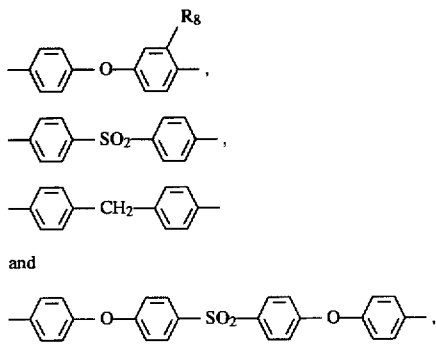

and

wherein $R_6$, $R_7$ and $R_8$ independently are hydrogen or lower alkyl and, more particularly, hydrogen or alkyl having 1 to 4 carbon atoms;

(B-1) at least about 10 mole % of a recurring moiety represented by the formula (III. 1)

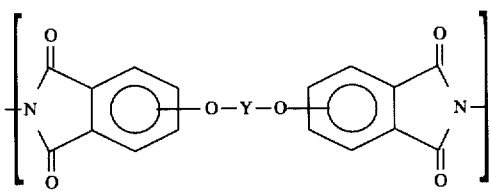
(III.1)

wherein Y is a divalent aromatic radical and, more specifically, a divalent aromatic radical of the formula

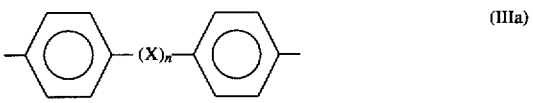
(IIIa)

wherein X is a divalent radical selected from the group consisting of

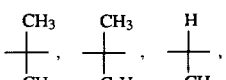

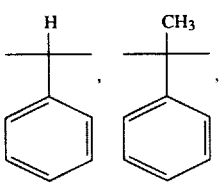

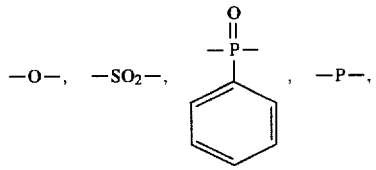

-continued

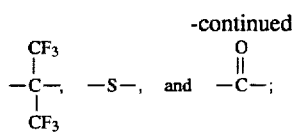

is 0 or 1 and, more specifically, X is selected from the group consisting of

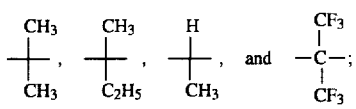

(B-2) from 0 to about 40 mole % of a recurring moiety represented by the formulae (IV.1)

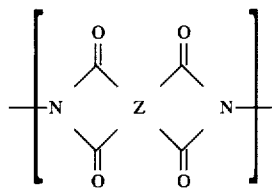
(IV.1)

wherein Z is a tetravalent aromatic radical, particularly, a tetravalent aromatic radical of substituted or unsubstituted phenyl, naphthyl or biphenyl tings; phenyl rings linked by a direct bond, O, S, SO$_2$, carbonyl or alkylene; or aromatic tings containing heterocyclic atoms such as pyrazine or thiophene; more particularly, (B-2) is from 0 to about 40 mole % of at least one recurring moiety of the formulae (IV.2)–(IV.3)

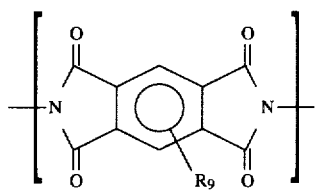
(IV.2)

wherein R$_9$ is hydrogen or lower alkyl;

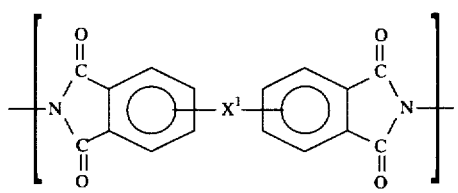
(IV.3)

wherein X$^1$ is selected from the group consisting of a direct carbon-to-carbon bond, O, SO$_2$, S, and a divalent carbonyl radical

and (C-1) at least about 3 mole % of at least one monovalent end-cap moiety selected from N-amides, N-imides and monovalent aromatic radicals having from 6 to about 30 carbon atoms, which end-cap moieties contain at least one crosslinkable functional group.

Those skilled in the art will appreciate that the N-amides and N-imides (C-1) are the monovalent residues of corresponding monoanhydride and acylhalide end-cap monomers (C). The monoanhydride and acylhalide monomer will cap polymer chains that terminate with a reactive nitrogen function, e.g. monomers (A). Likewise, it will be appreciated that the C$_6$–C$_{30}$ monovalent aromatic radicals are the residues of 30 corresponding aromatic amine end-cap monomers (C). The aromatic amine end-cap monomers (C) will cap polymer chains that terminate with a reactive anhydride function, e.g. monomer (B).

In one embodiment, the end-cap moiety (C-1) corresponds to at least one monovalent radical represented by the formulae:

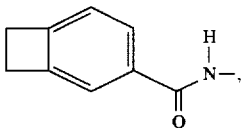
(1a)

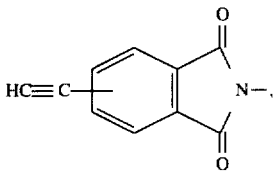
(2a)

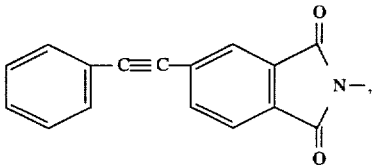
(3a)

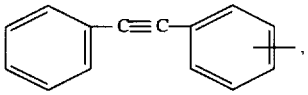
(4a)

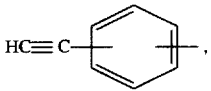
(5a)

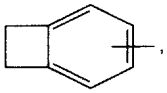
(6a)

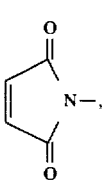
(7a)

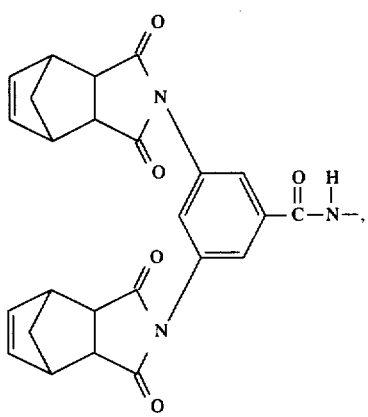

(8a)

and

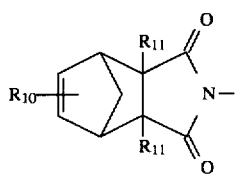

(9a)

wherein $R_{10}$ is allyl or methallyl; and $R_{11}$ is hydrogen or lower alkyl. The molar ratio of recurring structural units in the polyimide oligomer molecule (A-1)-(A-2):(B-1)-(B-2):(C-1) generally is about (1):(1-n):2n to about (1-n):(1):2n, where n is a number of from about 0.03 to about 0.25.

In a more specific embodiment, the recurring moiety (A-1) is present in the oligomer in an amount of from 10 to about 50 mole %, more preferably, from about 25 to about 50 mole % and, most preferably, from about 40 to about 50 mole %.

In another embodiment of the invention, about 30 to about 40 mole % of the recurring moiety (A-2) is present in the oligomer. More particularly, moiety (A-2) is present in the polyimide oligomer in an amount of from about 20 to about 30 mole % and, most particularly, from 0 to about 10 mole %.

In like manner, it is preferred that the recurring moiety (B-1) is present in the oligomer in an amount of from about 10 to about 50 mole %, more preferably, from about 20 to about 50 mole %, and, most preferably, from about 40 to about 50 mole %.

With regard to (B-2), this recurring moiety generally is present in the polyimide oligomer in an amount of from about 30 to about 40 mole %, more particularly, from about 20 to about 30 mole %, and, most preferably, from 0 to about 10 mole %.

In a specific embodiment, the end-cap moiety (C-2) generally is present in the polyimide oligomer in an amount of from about 3 to about 25 mole %. More specifically, the end-cap moiety is present in the range of about 5 to about 15 mole %.

The polyimide oligomers which are prepared as described above have a number average molecular weight (Mn) of from about 1,000 to about 15,000, more particularly, about 3,000 to about 10,000.

In one embodiment, the present invention pertains to polyimides oligomers that are obtained from a reaction mixture which is substantially free from monomeric components other than (A), (B) and (C).

In another embodiment, the present invention contemplates mixtures of polyimide oligomers having varying degrees of polymerization.

For purposes of this invention, the molecular weight values, both Mn and Mw, are determined by gel permeation chromatography (GPC). This separation method involves column chromatography in which the stationary phase is a rigid, heteropourous, solvent-swollen polymer network (in particle form) of a polystyrene gel (e.g., crosslinked styrene/divinyl benzene copolymers) varying in permeability over many orders of magnitude. The liquid or "mobile" phase is a solvent containing the sample polymer. As the sample passes through the gel, the polymer molecules diffuse into all pans of the gel not mechanically barred to them. The smaller molecules "permeate" more completely and spend more time in the column; the larger molecules "permeate" less and pass through the column more rapidly.

The Mn and Mw values of the polyimide oligomers of the present invention can be obtained by one of ordinary skill in the an by comparing the GPC distribution data obtained for the polyimide oligomers to a series of GPC calibration standards of polymers having a known molecular weight distribution. For example, polystyrene standards of varying molecular weights are used and N-methylpyrrolidinone treated with $P_2O_5$ is used as the mobile phase. This mobile phase may be obtained by the method described in S. H. Kim et al, Journal of Polym. Sci. Pan B: Polymer Physics, Vol. 29, 109–117 (1991). For example, the mobile phase is prepared as follows:

3 liters of N-methylpyrrolidone are poured into each of three 4 liter erlenmeyer flasks. Approximately 10 grams of $P_2O_5$ is added to each of the flasks along with a magnetic stir bar. The solutions are stirred for a minimum of 12 hours. The solutions are then filtered into a 20 liter round bottom flask. The combined solution is then agitated via a magnetic stir bar for a minimum of 2 hours to make the solution homogeneous. The resultant $P_2O_5$ treated NMP solution is filtered through a 0.5 μm filter before use.

The GPC sample preparation consists of, inter alia, dissolving 20–30 mg of the polyimide oligomer sample in P205 treated NMP and then filtering the solution through a 0.45 μm polytetrafluoroethylene filter in to a GPC sample vial. GPC columns are used which have retention volumes of $10^5$, $10^4$, $10^3$ and 500, respectively, and a 10 μm particle size. The mobile phase flow rate is 0.8 ml/min and the detector advantageously is a Waters Associates RI detector.

PROCESSING OF PREPREGS

The polyimide oligomers of the present invention can be prepregged by numerous techniques well-known to those skilled in the art. For example, one such procedure is to prepare prepregs from unsized AS-4 carbon fibers and polyimide/NMP solutions with viscosities ranging from 2,000 to 10,000 mPa.s, using a drum winder. The preepregs are allowed to dry on the drum and then stored in plastic bags at room temperature. Under this procedure, residual solvent contents are typically in the range of 10 to 20% by weight and the thickness of the prepregs is approximately 0.56 mm (0.022 inch). In general, some prepregs are tacky, while others are dry due to precipitation of the polyimide oligomer.

Alternatively, a treater line can be employed using sized fiber and various organic solvents, alone or in combination, such as diglyme, dimethylformamide, N-methylpyrrolidone, methylethylketone, dioxalane and the like with a resin content ranging from about 35 to 42% by weight and residual solvents of about 20 to 35% by weight

PROCESSING OF COMPOSITE LAMINATES

The prepregged polyimide oligomers of the present invention can be processed into composite laminates by numerous techniques well-known to those skilled in the art. For example, the prepregs are laid up, vacuum bagged and compression molded into unidirectional laminates based on the following schedule:

1. Cure: a press is heated from room temperature to about 290°–295° C. with 30 inch vacuum applied when the temperature reaches about 270°–290° C., and held for 2 hours.

2. Post-cure: the press is gradually heated up to about 316° C. and 200 psi pressure is applied when the temperature reaches 280° C.

3. After about 16 hours at about 316° C., the press is cooled slowly (1.5° C./min) to about 65° C. and the laminate is demolded.

The resin content of the resultant laminate is obtained, for example, according to the ASTM-D3171 method.

EXAMPLES

In order that those skilled in the art will be better able to practice the invention, the following examples are given by way of illustration and not by way of limitation. In the following examples, as well as elsewhere in the specification and claims, temperatures are in degrees Celsius, the pressure is atmospheric and all parts are by weight, unless otherwise clearly indicated.

Example A: Synthesis of Dinadicimidobenzoic acid

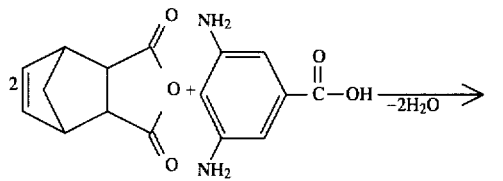

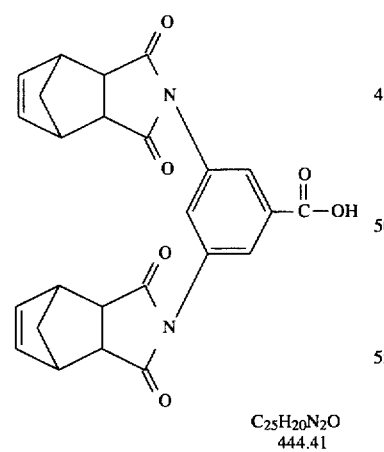

$C_{25}H_{20}N_2O$
444.41

In a 6 liter sulfonation flask, equipped with stirrer, condenser and thermometer, 2,800 ml acetic acid 100% (glacial) and 393.9 g of nadicanhydride (2.40 mole) are placed under nitrogen. While stirring, 182.6 g of 3,5-diaminobenzoic acid (.20 mole) is added and the reaction mixture is heated to reflux (113° C.). The now dark solution is stirred at reflux for 6 hours and then cooled to 100° C. A portion of charcoal is added and the mixture is stirred for minutes. The hot solution is then filtered through a preheated-buchner-funnel. Subsequently, the mixture is cooled, under stirring, to room temperature (at 80° C. a precipitate crystallizes). The white precipitate is filtered off, washed twice with 200 ml of acetic acid and then with approximately 3 l of water (about neutral). The product is dried under vacuum at 80°–90° C. overnight.

| Yield: 440 g (82%) | Calc. | Found |
|---|---|---|
| C: | 67.56% | 67.40% |
| H: | 4.54% | 4.45% |
| N: | 6.30% | 6.28% |
| Fp: | 238° C. | |

Example B: Synthesis of Dinadicimidobenzoic acid chloride (DNBC)

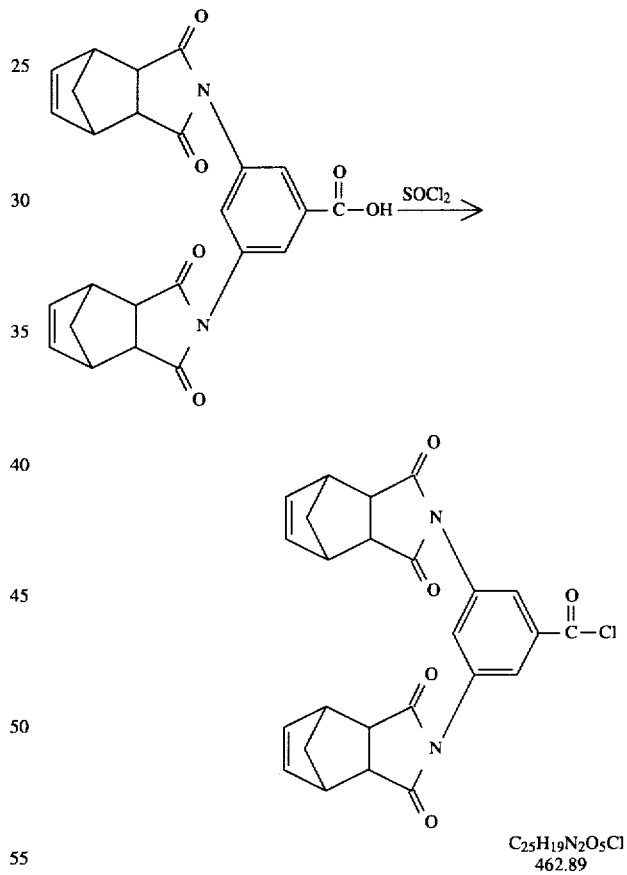

$C_{25}H_{19}N_2O_5Cl$
462.89

In a 2.5 liter sulfonation flask, equipped with stirrer, thermometer, condenser (cooled with ice-water), and gas absorption trap, is placed 1,350 ml methylene chloride, 333.3 g dinadicimidobenzoic acid (0.75 mole) and 11.0 g N,N-dimethylformamide. The mixture is heated to reflux with stirring. Over a period of 3 hours, 111.5 g of distilled thionyl chloride (0.938 mole, theory + 25%) is added from a dropping funnel under the surface of the reaction mixture. The mixture is stirred for an additional 10–12 hours until no further HCl/SO$_2$ is evolved. Then, the slightly brownish solution is transferred into a 2.5 liter round bottom flask and the solution is concentrated on a rotary evaporator to approximately 600 ml. Subsequently, the concentrated solution is added, under stirring, to 2,500 ml of cyclohexane and the combined solution is stirred for 15 minutes. DNBC is recovered as a white precipitate, is filtered, washed with 300 ml of cyclohexane and dried in a vacuum oven at 40°–50° C. overnight.

| Yield: 346 g (100%) | | Calc. | Found |
|---|---|---|---|
| | C: | 64.87% | 64.83 |
| | H: | 4.14% | 4.20 |
| | N: | 6.05% | 6.11 |
| | Cl: | 7.66% | 7.45 |

Example 1

Synthesis of a 5,000 MW DAPI/BPADA/ANA Polyimide Oligomer (5/6)-amino-1-(4'-aminophenyl)-1,3,3-trimethylindane (DAPI), 39.96 grams (0.1500 mole), 9.450 grams (0.04630 mole) of allylnadic anhydride (ANA), and 300 mls of N-methylpyrrolidinone (NMP) is charged into a one liter flask. The solution is stirred under nitrogen at room temperature (25° C.) for five hours. To the stirring solution is added 65.88 grams (0.1266 mole) of 2,2-bis[4-(3,4-dicarboxyphenoxy)phenyl]propane dianhydride (BPADA) and 150 mls of NMP. The solution is then stirred overnight (12–15 hours) at ambient temperature. The polyamic-acid is then imidized chemically over a six hour period, while stirring, by adding 67.40 grams (0.660 mole) of acetic anhydride and 33.39 grams (0.3300 mole) of triethylamine. The product is then precipitated by pouring the solution into methanol and the resulting precipitate collected via vacuum filtration. The polyimide is then soaked in methanol followed by a hot water (70° C.) soak overnight. The polyimide is then dried in an air circulating oven overnight and afterwards in a vacuum oven at 150° C. The polyimide has an intrinsic viscosity of 0. 17 and molecular weights (GPC using polystyrene standards): Mw=12,533, Mn=5,129, Mw/Mn=2.44; Tg=256° C. via DSC. The molar ratios are 1:0.84:0.31 DAPI/BPADA/ANA.

Example 2

Synthesis of a 5,000 Mw DAPI/BPADA/DNBC Polyimide Oligomer

Into a reaction vessel is placed 106.98 grams (0.4016 mole) of DAPI, 175.28 grams (0.3368 mole) of BPADA, and 1.25 liters of NMP. The solution is stirred at ambient temperature, under a stream of nitrogen, for 1.5 hours. To the solution is added 87 grams of toluene. The reaction mixture is then azeotropically refluxed to 155° C., collecting the water in a Dean & Stark trap. The reaction mixture is cooled down after the theoretical amount of water is removed. Upon reaching room temperature 13.70 grams (0.1354 mole) of triethyl amine and 63.8 grams (0.1379 mole) of 3,5-Dinadic benzoyl chloride (DNBC.) from Example B are added to the reaction, and the reaction mixture is stirred for 4 hours. The work-up and isolation is done as shown in example 1. The corresponding polyimide oligomer has an intrinsic viscosity of 0.18 and molecular weights (GPC using polystyrene standards): Mw=12,077, Mn=6,235, Mw/Mn=1.93; Tg=254° C. The molar ratios are 1:0.84: 0.34 DAPI/BPADA/DNBC.

Example 3

Synthesis of a 10,000 Mw DAPI/BPADA/DNBC Polyimide Oligomer

The same procedure is used as is shown in example 2 except for the amounts of materials used (i.e. molar ratios). 206.05 grams (0.3959 mole) of BPADA, 111.88 grams (0.4200 mole) of DAPI, 24.00 grams (.0518 mole) of DNBC, 5.770 grams (0.0569 mole) of triethylamine, and 1.5 liters of NMP are employed. The corresponding polyimide has an intrinsic viscosity of 0.27 and molecular weights (GPC using polystyrene standards): Mw=22,053, Mn=10, 638, Mw/Mn=2.07; Tg=234° C. The molar ratios are 1.0: 0.94: 0.12 DAPI/BPADA/DNBC.

Examples 4–7

Following procedures similar to those outlined in examples 1–3, polyimide oligomers are prepared from BPADA, DAPI and the end-capping monomers shown in Table I

TABLE I

| Example | End-cap monomer |
|---|---|
| 4 |  |
| 5 |  |
| 6 |  |

TABLE I-continued

| Example | End-cap monomer |
|---------|-----------------|
| 7 | (maleic anhydride structure) |

Examples 8–10

Following procedures similar to those outlined in examples 1–3, with the exception that the molar ratio of DAPI and BPADA are reversed, polyimide oligomers are prepared from BPADA, DAPI and the end-capping monomers shown in Table II

TABLE II

| Example | End-cap monomer |
|---------|-----------------|
| 8 | diphenylacetylene-NH₂ structure (phenyl–C≡C–phenyl–NH₂) |
| 9 | HC≡C–phenyl–NH₂ |
| 10 | benzocyclobutene–NH₂ |

Example 11

Synthesis of a 5,000 MW DAPI/BPADA/TDA/DNBC Polyimide Oligomer

Into a reaction vessel is placed 186.459 grams (0.7000 mole) of DAPI, 159.606 grams (0.30667 mole) of BPADA, 98.813 grams (0.30667 mole) of 3,3',4,4'-benzophenone tetracarboxylic acid dianhydride (BTDA) and 1.30 liters of NMP. The solution is stirred at ambient temperature, under a stream of nitrogen, for 1.5 hours. To the solution is added 100 mls of toluene. The reaction mixture is then azeotropically refluxed to 155° C., collecting the water in a Dean & Stark trap. The reaction mixture is cooled down after the theoretical amount of water is removed. Upon reaching room temperature 96.676 grams (0.9554 mole) of triethyl amine and 84.2 grams (0.18207 mole) of 3,5-Dinadic benzoyl chloride (DNBC.) are added to the reaction, and the reaction mixture is stirred for 4 hours. The work-up and isolation is done as shown in example 1. The corresponding polyimide oligomer has molecular weights (GPC using polystyrene standards): Mw=17,583, Mn=7,792, Mw/Mn= 2.26; Tg=296° C.

Examples 12–17

Polyimide oligomers are prepared by repeating the synthesis of example 11 wherein 25 mole % of the aromatic amine DAPI is replaced with the aromatic diamines shown in Table III:

TABLE III

| Example | Aromatic diamine |
|---------|------------------|
| 12 | p-phenylenediamine, |
| 13 | m-phenylenediamine, |
| 14 | 4,4'-diaminodiphenyl ether (ODA), |
| 15 | 4,4'-diamino-diphenyl sulfone, |
| 16 | m-xylylenediamine, and |
| 17 | bis(p-aminophenyl) methane. |

Examples 18–21

Polyimide oligomers are prepared by repeating the synthesis of example 11 wherein BTDA is replaced with the dianhydrides shown in Table IV:

TABLE IV

| Example | Dianhydride |
|---------|-------------|
| 18 | pyromellitic dianhydride, |
| 19 | 3,3',4,4'-biphenyl tetracarboxylic acid dianhydride, |
| 20 | 3,3',4,4'-diphenylsulfone tetracarboxylic acid dianhydride, and |
| 21 | 4,4'-oxydiphthalic dianhydride. |

Example 22–25

Following procedures similar to those outlined in example 11, polyimide oligomers are prepared from DAPI, BPADA, BTDA, and the end-capping monomers shown in Table V:

TABLE V

| Example | End-cap monomer |
|---------|-----------------|
| 22 | benzocyclobutene–C(=O)–Cl |
| 23 | HC≡C–phthalic anhydride |
| 24 | phenyl–C≡C–phthalic anhydride |

TABLE V-continued

| Example | End-cap monomer |
|---|---|
| 25 | (maleic anhydride structure) |

Examples 26–28

Following procedures similar to those outlined in example 11, with the exception that the molar ratio of DAPI and the dianhydride component (BPADA/BTDA) are reversed, polyimide oligomers are prepared from DAPI, BPADA, BTDA and the end-capping monomers shown in Table VI:

TABLE VI

| 26 | (phenyl–C≡C–phenyl–NH₂ structure) |
|---|---|
| 27 | HC≡C–phenyl–NH₂ |
| 28 | (benzocyclobutene-NH₂ structure) |

Example 29

Composites are made from the polyimide oligomers of the invention by the following method:

Either N-methylpyrolidinone, 1,3-dioxolane or $CH_2Cl_2$ (180 g) is added to a polyimide oligomer (120 g) of the foregoing examples. The polyimide oligomer is stirred until fully dissolved. The resulting solution is drum wound onto Carbon Fiber (AS4, unsized) to give a prepreg with 40% w/w resin content. The prepreg is cured using the cure cycle shown below:

1. Cure: a press is heated from room temperature to about 290°–295° C. with 30 inch vacuum applied when the temperature reaches about 270°–290° C., and held for 2 hours.

2. Post-cure: the press is gradually heated up to about 316° C. and 200 psi pressure is applied when the temperature reaches 280° C.

3. After about 16 hours at about 316° (2, the press is cooled slowly (1.5° C./min) to about 65° C. and the laminate is demolded.

The resin content of the resultant laminate is obtained according to the ASTM-D317 1 method.

As mentioned above, the major advantage of the polyimide oligomers of the present invention is that they are solution prepregable (i.e. soluble in common solvents). It also has been observed that the composites made from the polyimide oligomers of the invention exhibit high Tg's as well as high temperature and oxidative stability.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A polyimide oligomer comprising the condensation product of:

(A) an aromatic diamine component comprising at least about 25 mole % of at least one phenylindane diamine;

(B) a dianhydride component comprising at least about 25 mole % of at least one aromatic bis(ether anhydride); and (C) at least one end-cap monomer selected from the group consisting of monoanhydrides, acyl halides and aromatic amines, wherein each end-cap monomer contains at least one crosslinkable functional group in the molecule.

2. A polyimide oligomer according to claim 1, wherein the aromatic diamine component (A) is selected from:

(A-i) from about 25 to about 100 mole % of at least one phenylindane diamine represented by the formula

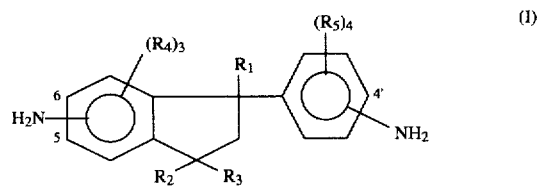

(I)

wherein $R_1$, $R_2$ and $R_3$ independently are hydrogen or lower alkyl, and each $R_4$ and each $R_5$ independently are hydrogen, halogen or lower alkyl; or (A-ii) from 0 to about 75 mole % of at least one aromatic diamine, other than a phenylindane diamine, represented by the formula

(II)

wherein R is a divalent aromatic radical.

3. A polyimide oligomer according to claim 1, wherein the dianhydride component (B) is selected from:

(B-i) from about 25 to about 100 mole % of at least one aromatic bis(ether anhydride) represented by the formula

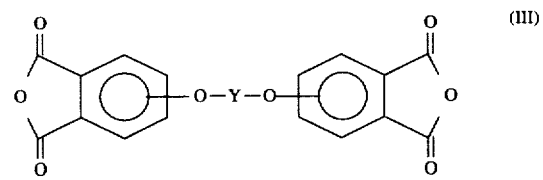

(III)

wherein Y is a divalent aromatic radical; or (B-ii) from 0 to about 75 mol % of at least one dianhydride, other than an aromatic bis(ether anhydride), represented by the formula

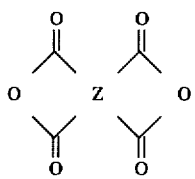

wherein Z is a tetravalent hydrocarbyl radical.

4. A polyimide oligomer according to claim 2, wherein the phenylindane diamines (A-i) are represented by the formula

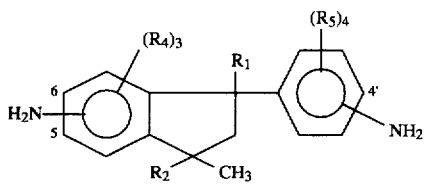

wherein $R_1$ and $R_2$ independently are hydrogen or $C_1$–$C_5$ alkyl, and each $R_4$ and each $R_5$ independently are hydrogen, halogen or $C_1$–$C_4$ alkyl.

5. A polyimide oligomer according to claim 4, wherein the phenylindane diamines (A-i) are represented by the formula

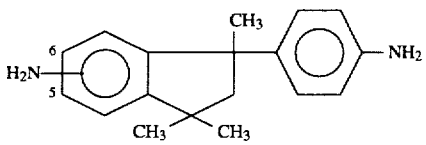

in which the amino on the indane ring is at the 5 or 6 position.

6. A polyimide oligomer according to claim 2, wherein (A-ii) is an aromatic diamine of formula II and R is a divalent aromatic radical selected from the group consisting of

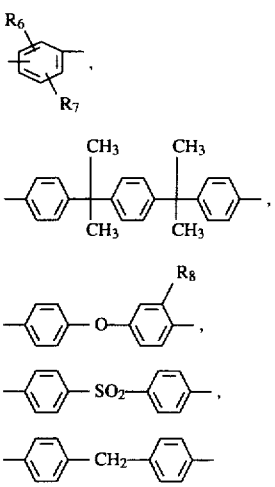

and

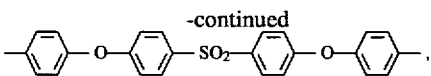

wherein $R_6$, $R_7$ and $R_8$ independently are hydrogen or lower alkyl.

7. A polyimide oligomer according to claim 6, wherein (A-ii) is an aromatic diamine selected from the group consisting of p-phenylenediamine, m-phenylenediamine, 4,4'-diaminodiphenyl ether, 4,4'-diamino-diphenyl sulfone, m-xylylenediamine and bis(p-aminophenyl) methane.

8. A polyimide oligomer according to claim 3, wherein (B-i) is an aromatic bis(ether anhydride) of formula III and group Y is a divalent aromatic radical represented by the formula

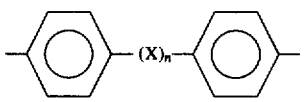

wherein X is a divalent radical selected from the group consisting of

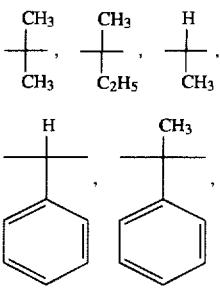

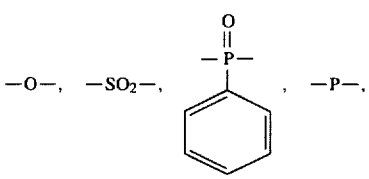

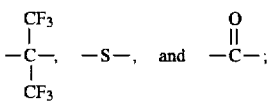

and n is 0 or 1.

9. A polyimide oligomer according to claim 8, wherein X is selected from the group consisting of

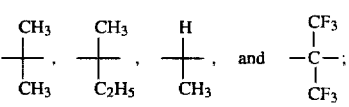

and n is 1.

10. A polyimide oligomer according to claim 9, wherein (B-i) is an aromatic bis(ether anhydride) represented by the formula

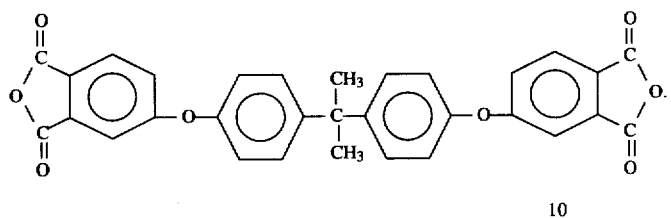

11. A polyimide oligomer according to claim 3, wherein the dianhydrides (B-ii) are selected from a compound represented by the formulae

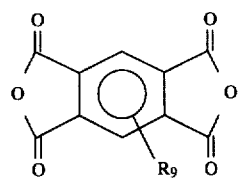 (IVa)

wherein $R_9$ is hydrogen or lower alkyl; or

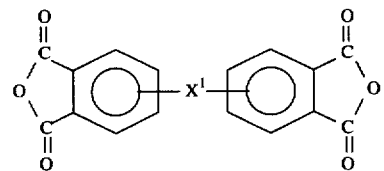 (IVb)

wherein $X^1$ is selected from the group consisting of a direct carbon-to-carbon bond, O, $SO_2$, S, and a divalent carbonyl radical

.

12. A polyimide oligomer according to claim 11, wherein the dianhydrides (B-ii) are selected from the group consisting of pyromellitic dianhydride, 3,3',4,4'-benzophenone tetracarboxylic acid dianhydride, 3,3',4,4'-biphenyl tetracarboxylic acid dianhydride, 3,3',4,4'-diphenylsulfone tetracarboxylic dianhydride, and 4,4'-oxydiphthalic dianhydride.

13. A polyimide oligomer according to claim 1, wherein (C) is at least one end-cap monomer selected from the group consisting of monoanhydrides, acyl halides and amines, wherein each end-cap monomer (C) contains at least one crosslinkable group in the molecule selected from the group consisting of vinyl, ethynyl, maleimido, cyano, nadic and acetylenic.

14. A polyimide oligomer according to claim 1, wherein (C) is at least one end-cap monomer selected from the group consisting of a compound represented by the following formulae (1) through (9):

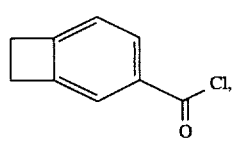 (1)

-continued

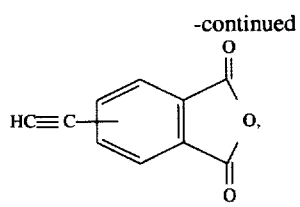 (2)

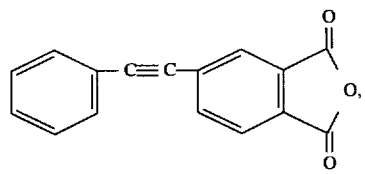 (3)

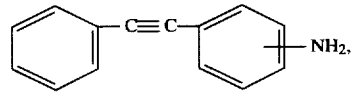 (4)

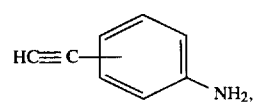 (5)

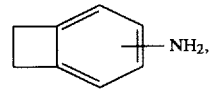 (6)

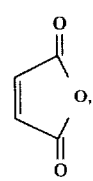 (7)

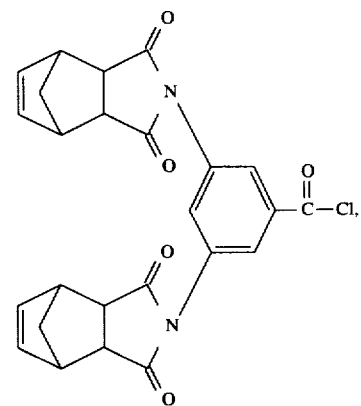 (8)

and

-continued

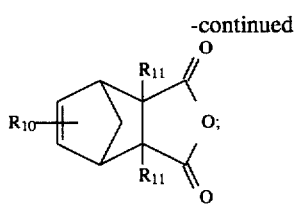
(9)

wherein $R_{10}$ is allyl or methallyl; and $R_{11}$ is hydrogen or lower alkyl.

15. A polyimide oligomer according to claim 2, which has a number average molecular weight of from about 1,000 to about 15,000.

16. A polyimide oligomer according to claim 15, which has a number average molecular weight of from about 3,000 to about 10,000.

17. A polyimide oligomer according to claim 1, wherein the molar ratio (A):(B):(C.) is (1):(1-n):(~2.1n), wherein n is a number from about 0.03 to about 0.25 and the symbol (~) means +/−10%.

18. A polyimide oligomer according to claim 2, wherein the molar ratio (A):(B):(C.) is (1-n):(1 ):(~2. In), wherein n is a number from about 0.03 to about 0.25 and the symbol (~) means +/−10%.

19. A polyimide oligomer which comprises: (A-1) at least about 10 mole % of a recurring moiety represented by the formula (I.1)

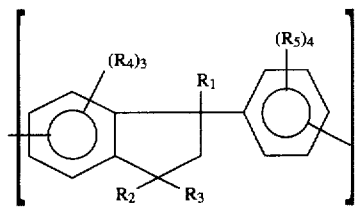
(I.1)

wherein $R_1$, $R_2$ and $R_3$ independently are hydrogen or lower alkyl, and each $R_4$ and each $R_5$ independently are hydrogen, halogen or lower alkyl;

(A-2) from 0 to about 40 mole % of a recurring moiety represented by the formula (II.1)

-(II.1)

wherein R is divalent aromatic radical;

(B-1) at least about 10 mole % of a recurring moiety represented by the formula (III.1)

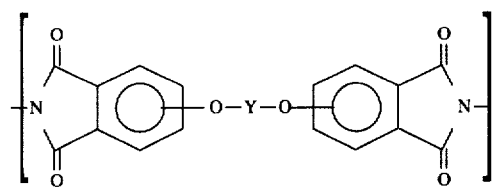
(III.1)

wherein Y is a divalent aromatic radical;

(B-2) from 0 to about 40 mole % of a recurring moiety represented by the formulae (IV.1)

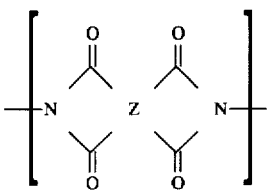
(IV.1)

wherein Z is a tetravalent aromatic radical; and (C-1) at least about 3 mole % of at least one monovalent end-cap moiety selected from N-amides, N-imides and monovalent aromatic radicals having from 6 to about 30 carbon atoms, which end-cap moieties contain at least one crosslinkable functional group.

20. A polyimide oligomer according to claim 19, wherein R is divalent aromatic radical selected from the group consisting of

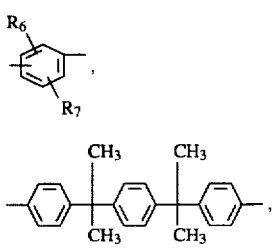

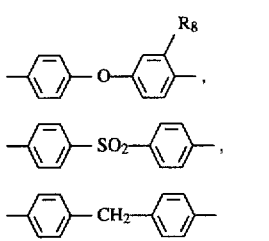

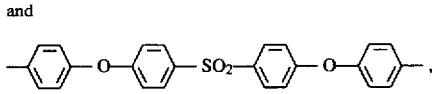

and

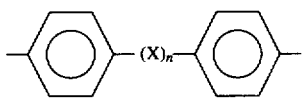

wherein $R_6$, $R_7$ and $R_8$ independently are hydrogen or lower alkyl.

21. A polyimide oligomer according to claim 19, wherein Y is a divalent aromatic radical represented by the formula

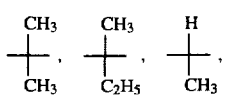
(IIIa)

wherein X is a divalent radical selected from the group consisting of $$\begin{array}{ccc} CH_3 & CH_3 & H \\ | & | & | \\ -C- & -C- & -C- \\ | & | & | \\ CH_3 & C_2H_5 & CH_3 \end{array}$$

-continued

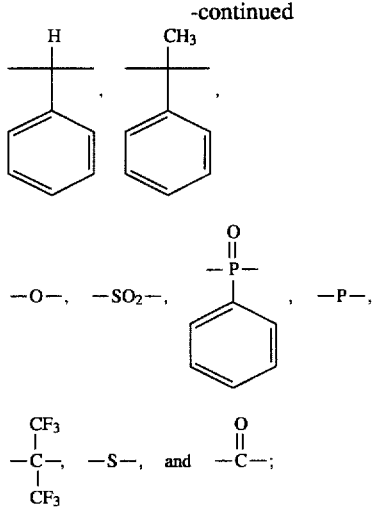

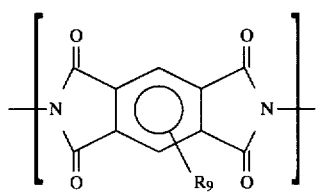

and n is 0 or 1.

22. A polyimide oligomer according to claim 19, wherein (B-2) is from 0 to about 40 mole % of at least one recurring moiety represented by the formulae (IV.2)–(IV.3)

(IV.2)

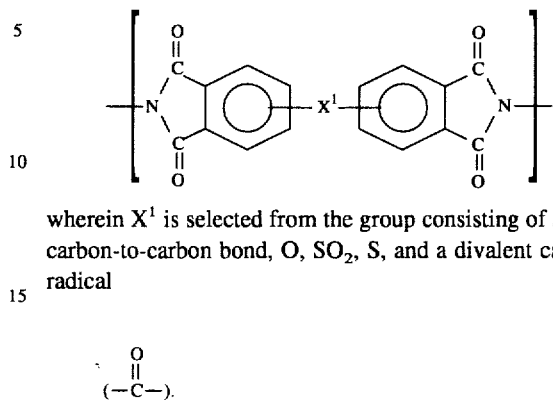

wherein $R_9$ is hydrogen or lower alkyl;

(IV.3)

wherein $X^1$ is selected from the group consisting of a direct carbon-to-carbon bond, O, $SO_2$, S, and a divalent carbonyl radical $$(-\overset{O}{\underset{\|}{C}}-).$$

23. A polyimide oligomer according to claim 19, wherein the molar ratio of recurring structural units (A-1)-(A-2):(B-1)-(B-2):(C-1) is about (1):(1-n):2n to about (1-n):(1):(2n), where n is a number of from about 0.3 to about 0.25.

24. A thermoset molding powder composition comprising a polyimide oligomer according to claim 19.

25. A prepreg comprising a reinforcing fiber, and a matrix resin comprising a polyimide oligomer according to claim 19.

26. A composite structure comprising a reinforcing fiber, and a matrix material comprising a crosslinked polyimide oligomer according to claim 19.

* * * * *